(12) United States Patent
Derschmidt (10) Patent No.: US 10,584,704 B2
(45) Date of Patent: Mar. 10, 2020

(54) FLUSHABLE DEVICE FOR MEASURING FLOW PROCESSES OF FLUIDS (71) Applicant: AVL LIST GMBH, Graz (AT)

(72) Inventor: Otfried Derschmidt, Graz (AT)

(73) Assignee: AVL LIST GMBH, Graz (AT)

(*) Notice: Subject to any disclaimer, the term of this patent is extended or adjusted under 35 U.S.C. 154(b) by 182 days.

(21) Appl. No.: 15/759,521

(22) PCT Filed: Sep. 15, 2016

(86) PCT No.: PCT/EP2016/071766
§ 371 (c)(1),
(2) Date: Mar. 13, 2018

(87) PCT Pub. No.: WO2017/046206
PCT Pub. Date: Mar. 23, 2017

(65) Prior Publication Data
US 2019/0145408 A1 May 16, 2019

(30) Foreign Application Priority Data
Sep. 15, 2015 (AT) .................. A 601/2015

(51) Int. Cl.
F04C 15/06 (2006.01)
F04C 2/344 (2006.01)
(Continued)

(52) U.S. Cl.
CPC ............ *F04C 15/06* (2013.01); *F04C 2/10* (2013.01); *F04C 2/344* (2013.01); *G01F 3/10* (2013.01);
(Continued)

(58) Field of Classification Search
CPC .. G01F 3/10; G01F 15/026; F04C 2/10; F04C 2/344; F04C 15/06; F04C 2220/24; F04C 2220/40
See application file for complete search history.

(56) References Cited

U.S. PATENT DOCUMENTS 2,835,229 A * 5/1958 Richards .................. F04C 2/36
418/7
2,845,031 A 7/1958 Guibert
(Continued)

FOREIGN PATENT DOCUMENTS

CN 1372133 A 10/2002
CN 2692638 Y 4/2005
(Continued)

*Primary Examiner* — David J Bolduc
(74) *Attorney, Agent, or Firm* — Norman B. Thot (57) ABSTRACT A device for measuring flow processes of fluids. The device includes an inlet, an outlet, a drive unit, a positive displacement flow meter which is driven by the drive unit, the positive displacement flow meter including a positive displacement chamber, a supply duct which fluidically connects the positive displacement chamber to the inlet, a discharge duct which fluidically connects the positive displacement chamber to the outlet, a bypass which bypasses the positive displacement flow meter, a differential pressure sensor arranged in the bypass, and an evaluation and control unit which provides a control of the positive displacement flow meter based on a differential pressure applied to the differential pressure sensor. The supply duct and the discharge duct each rise in a fluid flow direction.

20 Claims, 8 Drawing Sheets (51) Int. Cl.
*G01F 3/10* (2006.01)
*G01F 15/02* (2006.01)
*F04C 2/10* (2006.01)

(52) U.S. Cl.
CPC ........ *G01F 15/026* (2013.01); *F04C 2220/24* (2013.01); *F04C 2220/40* (2013.01)

(56) References Cited

U.S. PATENT DOCUMENTS

| | | | | |
|---|---|---|---|---|
| 3,255,630 A * | 6/1966 | Henning | ............ | G01F 3/10 73/253 |
| 3,273,502 A | 9/1966 | Martz | | |
| 3,633,420 A | 1/1972 | Holzem | | |
| 4,105,377 A * | 8/1978 | Mayall | ............ | E21B 4/02 175/106 |
| 4,193,299 A | 3/1980 | Holzem et al. | | |
| 4,953,403 A * | 9/1990 | Springer | ............ | G01F 3/10 73/198 |
| 5,435,698 A * | 7/1995 | Phillips | ............ | B62D 5/06 417/220 |
| 5,682,745 A * | 11/1997 | Phillips | ............ | B62D 5/06 60/431 |
| 7,513,150 B2 * | 4/2009 | Parris | ............ | F16K 47/02 73/276 |
| 7,905,141 B2 * | 3/2011 | Wakamatsu | ............ | G01F 1/38 73/239 |
| 7,905,142 B2 * | 3/2011 | Wakamatsu | ............ | G01F 3/10 73/239 |
| 2002/0166320 A1 * | 11/2002 | Buscher | ............ | F01P 7/044 60/425 |
| 2004/0163459 A1 | 8/2004 | Christian et al. | | |
| 2006/0201244 A1 | 9/2006 | Metzler et al. | | |
| 2007/0192046 A1 * | 8/2007 | Hairston | ............ | G01F 25/0053 702/45 |
| 2009/0035121 A1 * | 2/2009 | Watson | ............ | F01C 1/126 415/1 |
| 2012/0024080 A1 * | 2/2012 | Carbone, II | ............ | G01F 3/10 73/861.04 |
| 2012/0255367 A1 * | 10/2012 | Kitami | ............ | G01F 1/74 73/861.04 |
| 2014/0109644 A1 * | 4/2014 | Carbone, II | ............ | G01F 25/0007 73/1.16 |
| 2015/0369646 A1 | 12/2015 | Derschmidt | | |

FOREIGN PATENT DOCUMENTS

| | | |
|---|---|---|
| DE | 1 798 080 B1 | 10/1973 |
| DE | 27 28 250 A1 | 1/1979 |
| DE | 103 31 228 B3 | 1/2005 |
| DE | 11 2014 003 050 A5 | 4/2016 |
| EP | 1 437 578 A1 | 7/2004 |
| GB | 2 185 785 A | 7/1987 |
| KR | 10-0466317 B1 | 1/2005 |
| NL | 66381 C | 4/1950 |
| WO | WO 2014/118045 A1 | 8/2014 |
| WO | WO 2014/206767 A1 | 12/2014 |

* cited by examiner

FLUSHABLE DEVICE FOR MEASURING FLOW PROCESSES OF FLUIDS

CROSS REFERENCE TO PRIOR APPLICATIONS

This application is a U.S. National Phase application under 35 U.S.C. § 371 of International Application No. PCT/EP2016/071766, filed on Sep. 15, 2016 and which claims benefit to Austrian Patent Application No. A 601/2015, filed on Sep. 15, 2015. The International Application was published in German on Mar. 23, 2017 as WO 2017/046206 A1 under PCT Article 21(2).

FIELD

The present invention relates to a device for measuring flow processes of fluids, comprising an inlet, an outlet, a positive displacement flow meter which is driven by a drive unit, the positive displacement chamber of which is fluidically connected to the inlet via a supply duct and to the outlet via a discharge duct, a bypass that allows the positive displacement flow meter to be bypassed, a differential pressure sensor which is placed in the bypass, and an evaluation and control unit that allows the drivable positive displacement flow meter to be controlled in accordance with the differential pressure applied to the differential pressure sensor.

BACKGROUND

Such devices have been known for several years and are used, for example, to inject a quantity measurement in internal combustion motors.

The original version of such a device for through-flow measurement was described in DE-AS 1 798 080. This electronically controlled flow meter comprises a main conduit with an inlet and an outlet, in which a rotary positive displacement flow meter in the form of a gear pump is arranged. A bypass runs parallel to the main conduit, via which bypass the rotary positive displacement flow meter can be bypassed and in which a piston serving as a differential pressure sensor is arranged in a measuring chamber. The excursion of the piston in the measuring chamber is measured using an optical sensor to determine the flow rate. The rotational speed of the gear pump is constantly readjusted via an evaluation and control unit based on this signal, the readjustment being such that the piston is always returned to its initial position, if possible, so that only small flows are generated in the bypass. The flow rate within a predefined time interval is calculated in this manner from the number of rotations or partial rotations of the gear pump measured by an encoder and from the known delivery quantity of the gear pump per revolution.

A flow quantity measuring device of this structure is also described in DE 103 31 228 B3. For determining the exact injection quantity profiles, the gear pump is set to a constant rotational speed prior to the start of each injection, so that the movement of the piston is measured subsequently, with this excursion being used to determine the injection profiles. A pressure sensor and a temperature sensor are also arranged in the measuring chamber, the measuring values of which are also supplied to the computing unit to calculate and to correct the injection quantity profiles.

For increasing measuring accuracy, it is in particular necessary, upon the start-up of the apparatus, to free the apparatus from entrapped air which, due to the compressibility of air, leads to significant measuring errors during the measuring process.

WO 2014/11 8041 A1 accordingly describes a flow meter in which a bypass duct is formed at the housing delimiting the measuring chamber of the differential pressure sensor, via which bypass duct a connection is made from the front of the piston to the rear of the piston when the piston abuts against an axial stop at the discharge-side end of the measuring chamber. Entrapped air can thereby get to the discharge-side surface of the piston so that, when the positive displacement flow meter conveys, the air is transported towards the outlet. A check valve is arranged in addition in the bypass duct which prevents a flow from the discharge side to the supply side, i.e., in the opposite direction, so as to be able, after flushing has been performed, to simply move the piston back into its intermediate position upon start-up.

It has been found, however, that existing air entrapments cannot be completely discharged from the flow meter thereby, but that these accumulate in different dead spaces of the apparatus and are only released after some time, which subsequently results in measuring errors. Problems in particular arise from air entrapments in the magnetic clutch with measuring devices that operate at high pressures and whose positive displacement flow meter is driven by an electric motor with an interposed magnetic clutch.

SUMMARY

An aspect of the present invention is to provide a device for measuring flow processes of fluids with which the measuring results are improved by removing air entrapments as completely as possible from the apparatus upon start-up. No additional components should, if possible, be used or connected therefor. An aspect of the present invention is that a corresponding flushing should be performed without connecting additional external flushing lines. An aspect of the present invention is lastly to make an emergency discharge of liquid possible, for example, when the gears of the gear flow meter become jammed.

In an embodiment, the present invention provides a device for measuring flow processes of fluids. The device includes an inlet, an outlet, a drive unit, a positive displacement flow meter which is driven by the drive unit, the positive displacement flow meter comprising a positive displacement chamber, a supply duct which fluidically connects the positive displacement chamber to the inlet, a discharge duct which fluidically connects the positive displacement chamber to the outlet, a bypass which is configured to bypass the positive displacement flow meter, a differential pressure sensor arranged in the bypass, and an evaluation and control unit configured to provide a control of the positive displacement flow meter based on a differential pressure applied to the differential pressure sensor. The supply duct and the discharge duct are each configured to rise in a fluid flow direction.

BRIEF DESCRIPTION OF THE DRAWINGS

The present invention is described in greater detail below on the basis of embodiments and of the drawings in which.

DETAILED DESCRIPTION

Air existing in the ducts or in the positive displacement flow meter is reliably discharged because the supply duct and the discharge duct are designed to rise in the flow direction of the fluid. Dead spaces in which air accumulates are avoided. The air instead automatically rises from the supply duct into the conveying chamber, is conveyed to the discharge port together with the measuring fluid, and, due to its lower density, rises again along the discharge duct towards the outlet. Air entrapments that compromise measuring results are accordingly reliably removed upon start-up.

A further improvement of the measuring results can be obtained by forming a bypass duct at the differential pressure sensor which extends from the interior of a measuring chamber of the differential pressure sensor into a flushing line that opens into a rotor chamber of a drive unit. Air at the front of the piston can thereby be discharged via the bypass duct and the flushing line towards the rotor chamber of the drive unit.

As a complementary measure, a supply port can, for example, be formed at the rotor chamber in the geodetically lower portion, the bypass opening into the supply port, and a discharge port can, for example, be formed in the geodetically upper portion, which discharge port is fluidically connected to the outlet. During the flushing process, all of the air present in the measuring chamber or the rotor chamber is thus conveyed to the outlet in its entirety and is correspondingly completely removed from the device.

In a development thereof, a piston is arranged inside the measuring chamber for axial displacement therein, the piston closing or clearing a bypass port from the measuring chamber to the bypass duct, wherein the bypass port is cleared by the piston and a fluidic connection between a supply port into the measuring chamber and the bypass duct is thereby established, when, on the outflow side, the piston abuts against a stop axially delimiting the piston movement. Upon standstill of the positive displacement flow meter, liquid is thus introduced into the system for flushing, whereby the piston is displaced so far that the bypass port is cleared and air present in the measuring chamber is discharged towards the rotor chamber.

In an embodiment of the present invention, the measuring chamber can, for example, be delimited by a hollow cylinder at whose opposite axial ends of the radially delimiting shell surface the supply port and a discharge port are formed which open into the bypass duct at the opposite ends of the differential pressure sensor, wherein the bypass port is formed at the shell surface and a check valve is arranged in the bypass. The bypass port is accordingly cleared by the movement of the piston. The check valve prevents a flow of fluid and air in the opposite direction so that the air can always flow only towards the rotor chamber via the bypass duct. The purpose of the check valve, which is mostly designed as a flap, is to facilitate the release of the piston from its end position after the flushing process.

The flushing line advantageously extends from the bypass duct through a piston housing in which the differential pressure sensor is arranged and through a positive displacement housing in which the positive displacement flow meter is arranged, to a supply port of the rotor chamber. No additional lines must thus be provided or mounted for ventilation.

A particularly simple realization of the duct sections in the positive displacement housing is provided by forming the positive displacement chamber in a sleeve that is arranged in a receiving opening of the positive displacement housing, wherein the flushing line section that extends through the displacement housing is formed by a bore in the sleeve.

In an embodiment of the present invention, the flushing line can, for example, branch from the bypass duct downstream of the check valve. A return flow of air from the flushing line is thereby prevented.

The flushing line can additionally extend from the discharge port through the displacement housing and the piston housing to the outlet so that these duct sections also do not have to be provided as separate ducts, but rather that a fluidic connection is formed upon assembly of the housing parts without any additional assembly steps.

In a first operating position of the device, the bypass port is advantageously formed at a geodetically highest point of the measuring chamber. It is thereby provided that air entrapments can reach the bypass port and can be discharged.

In an embodiment of the present invention, the first bypass duct can, for example, be fluidically connected to the discharge port of the measuring chamber exclusively via the rotor chamber. A flow through the flushing line is thus provided independent of existing pressure conditions, and the function of the bypass duct, i.e., the possible discharge of fluid flows, is still maintained, for example, in a case where the positive displacement flow meter becomes jammed.

A particularly simple sealing and assembly is obtained when the rotor chamber is delimited radially by a can which may then be fastened to the positive displacement housing, for example, by screws.

In an embodiment of the present invention, the can can, for example, separate an inner rotor from an outer rotor of a canned motor. Additional clutches are no longer needed in such a design. A direct drive of the impeller via the canned motor can instead be realized, whereby costs incurred for assembly and additional components are significantly reduced.

In an embodiment of the present invention, the can can, for example, separate an inner rotor from an outer magnetic rotor of a magnetic clutch. A standard electric motor can be used for the driving in this embodiment. The motor is not in contact with the fluid and thus simple to replace.

In an embodiment of the present invention, a second bypass port can, for example, be provided at the measuring chamber, the second bypass port being directed to the inlet and to the outlet and to open into a second bypass duct which opens into the measuring chamber on the discharge side. A ventilation of the measuring chamber is thereby provided in a second mounting position in which the inlet and the outlet are oriented upward.

A bypass discharge duct is formed for this purpose on the outflow side at the measuring chamber, which duct extends from the measuring chamber into the discharge duct so that the air conveyed during flushing or the liquid present when the positive displacement flow meter is blocked can be discharged to the outlet.

The second bypass port can, for example, be smaller than the first bypass port. It is thereby provided that a flow through the rotor chamber is also performed, so that the rotor chamber can be reliably vented also in the second mounting position.

An emergency operation line additionally advantageously branches from the first bypass duct, which line opens into the discharge duct either directly or via a discharge of the bypass. The line serves for an additional discharge of liquid in case of sudden high pressure increases, for example, due to a jamming of the gears of the positive displacement flow meter, and prevents damage in the device.

In an embodiment of the present invention, a pressure limiting valve can, for example, be arranged in the emergency operation line so that the emergency operation line only opens when a defined excessive pressure prevails in the device.

This emergency operation line can, for example, branch from the first bypass duct downstream of the flushing line so that, at lower pressures, no liquid from the device is supplied to the emergency operation line.

A device for measuring flow processes of fluids is thus provided, which device provides a quick and complete venting in two mounting positions when the device is started. All parts of the device through which fluid flows are here vented, including the rotor chamber. Damages to the device caused by sudden pressure peaks are also reliably avoided. This device accordingly allows measuring results to be obtained that are very exact over the entire service life so that time-resolved flow processes can also be measured with high precision over a long period of time. The device is simple to manufacture and to assemble so that no significant additional costs are incurred, despite the additional functions.

The device of the present invention for measuring flow processes of fluids will be described below under reference to a non-restrictive embodiment shown in the drawings.

Figure 1:
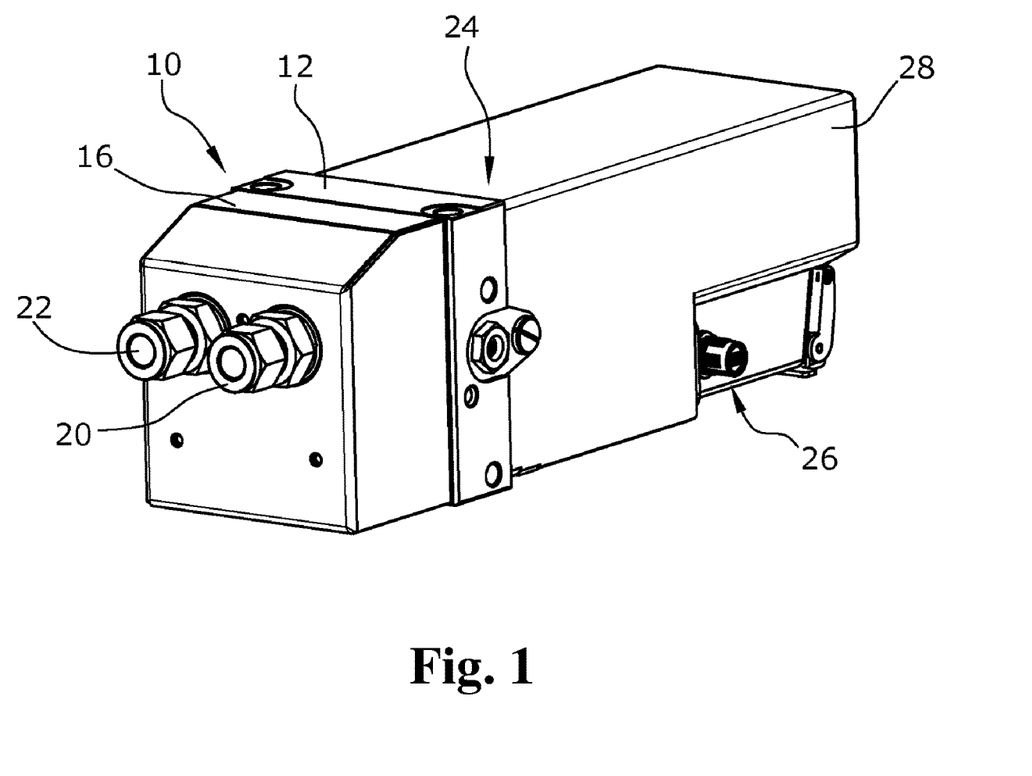
FIG. 1 shows a perspective view of the outer side of the device of the present invention.

FIG. 1 illustrates the outer side of a device of the present invention for measuring time-resolved flow processes. The device of the present invention comprises a housing 10 of a bipartite structure, wherein a positive displacement flow meter 14 is arranged in the first housing part 12 serving as a positive displacement housing 12, and a differential pressure sensor 18 is formed in the second housing part 16 serving as a piston housing 16. An inlet 20 and an outlet 22 are also formed at the piston housing 16. A drive unit 24 of the positive displacement flow meter 14, as well as the evaluation and control unit 26, are arranged inside a cover 28 that, like the piston housing 16, is fastened to the first housing part 12.

Figure 2:
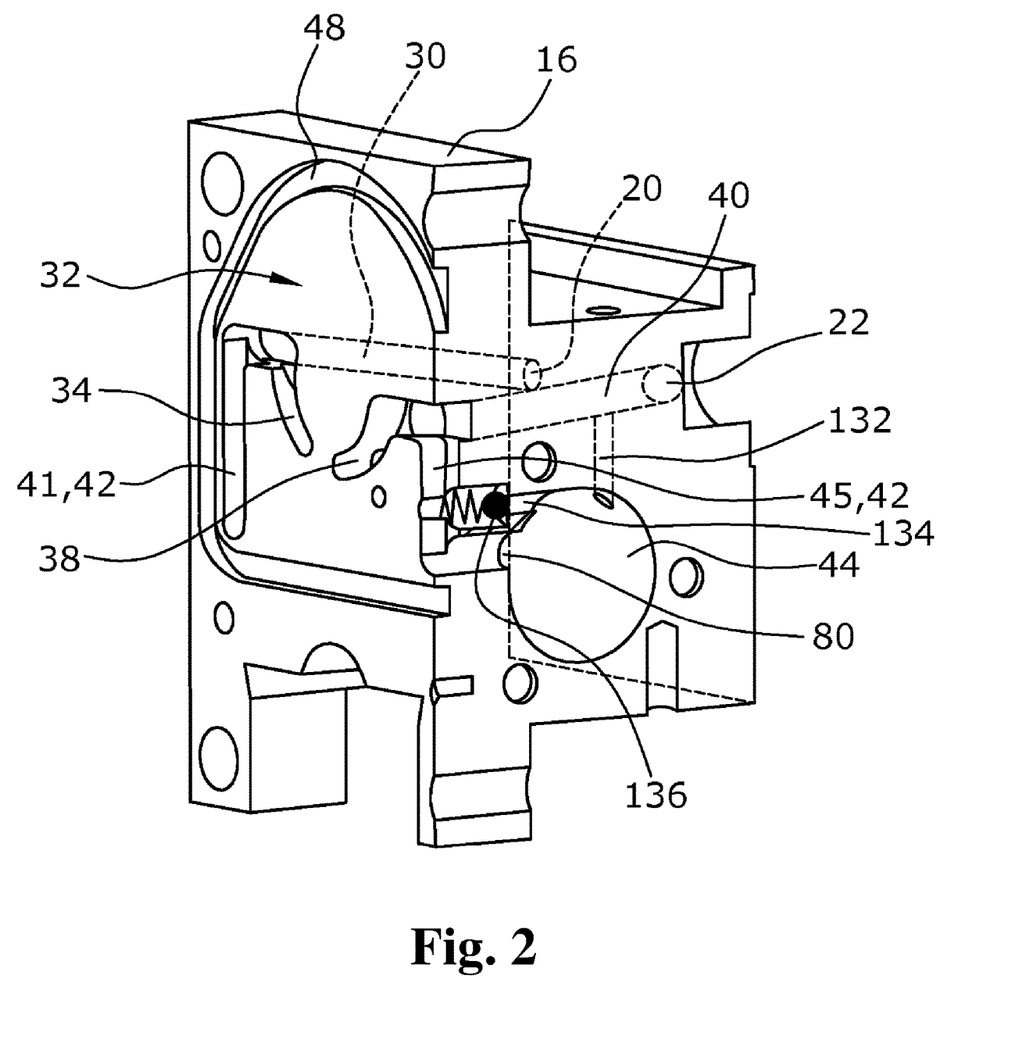
FIG. 2 shows a perspective view of the piston housing of the device of the present invention of FIG. 1 in section and with ducts formed in the interior and shown in broken lines.
Figure 3:
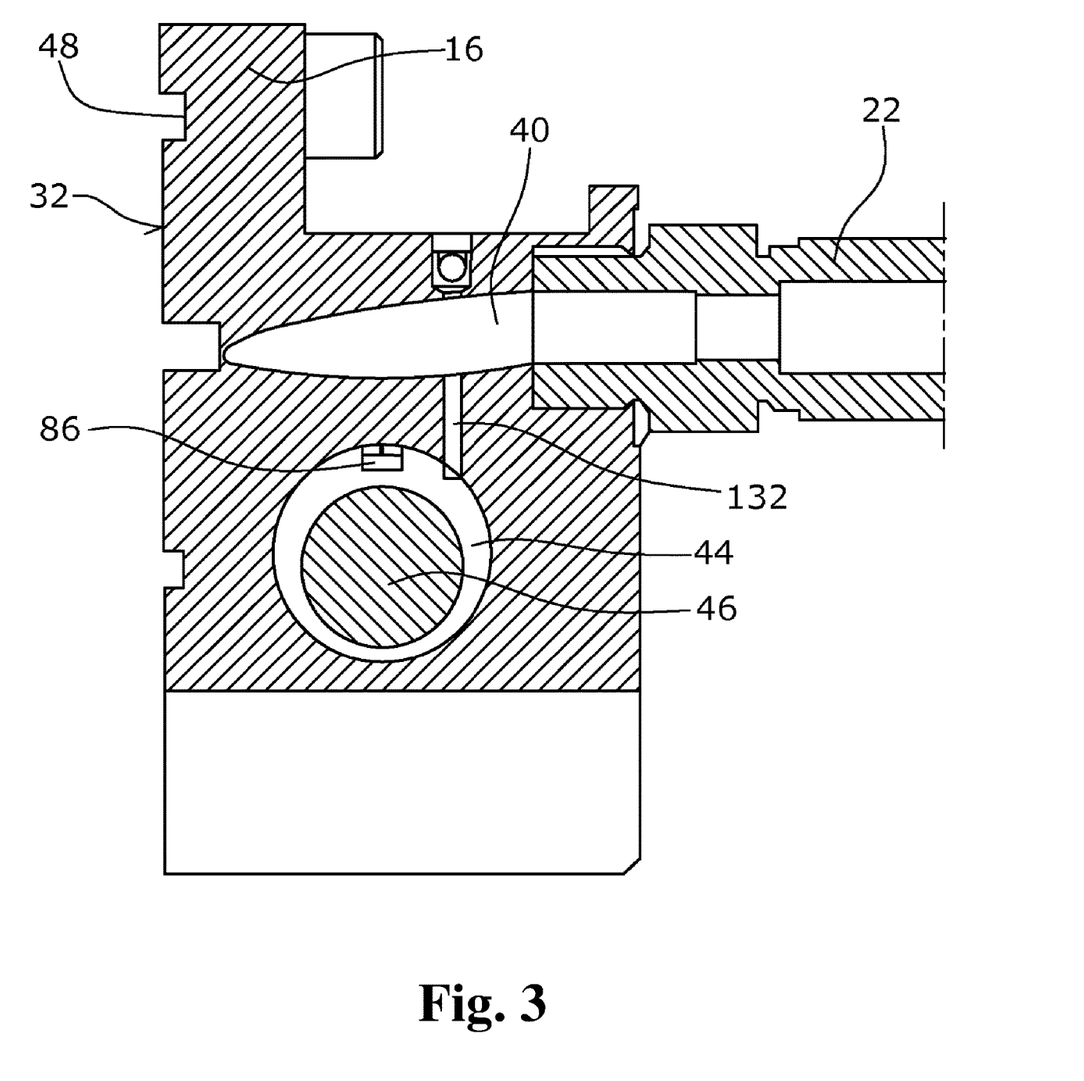
FIG. 3 shows a section through the piston housing of FIG. 2 in the region of the outlet.

FIG. 2 shows the piston housing 16. Fuel flows via the inlet 20 into a supply duct 30 extending through the piston housing 16 up to the front-face delimiting wall 32 thereof. A plurality of further ducts is milled in this front-face delimiting wall 32. The supply duct 30 first opens into a first kidney-shaped supply port 34 of the positive displacement flow meter 14 and leads into a positive displacement chamber 36 of the positive displacement flow meter 14 which can be seen in FIGS. 4 and 6. A discharge port 38 from the positive displacement chamber 36 is formed in the wall 2, the discharge port 38 also being kidney-shaped and leading into a discharge duct 40 which extends through the piston housing 16 and opens into the outlet 22. A first section of a bypass 42, serving as an inlet 41, also extends from the end of the supply duct 30 and leads into a measuring chamber 44 of the differential pressure sensor 18. A second section of the bypass 42, serving as a discharge 45, extends from the measuring chamber 44 from the side of a piston 46 displaceably arranged in the measuring chamber 44, which side is opposite with respect to the first section of the bypass 42, and opens into the discharge duct 40. The piston 46 has the same specific weight as the measuring fluid and is cylindrical in shape like the measuring chamber 44; the measuring chamber 44 thus has an inner diameter that substantially corresponds to the outer diameter of the piston 46. In FIG. 3, the piston 46 is illustrated as being smaller only to provide for a better distinction from the measuring chamber 44.

An axial groove 48 is formed in the front-face delimiting wall 32, which axial groove 48 surrounds the ducts formed in the piston housing 16 and which serves to receive a seal (not shown in the drawings) which abuts against the positive displacement housing 12 after assembly, so that the first housing part 12 and the second housing part 16 are tightly connected.

Figure 4:
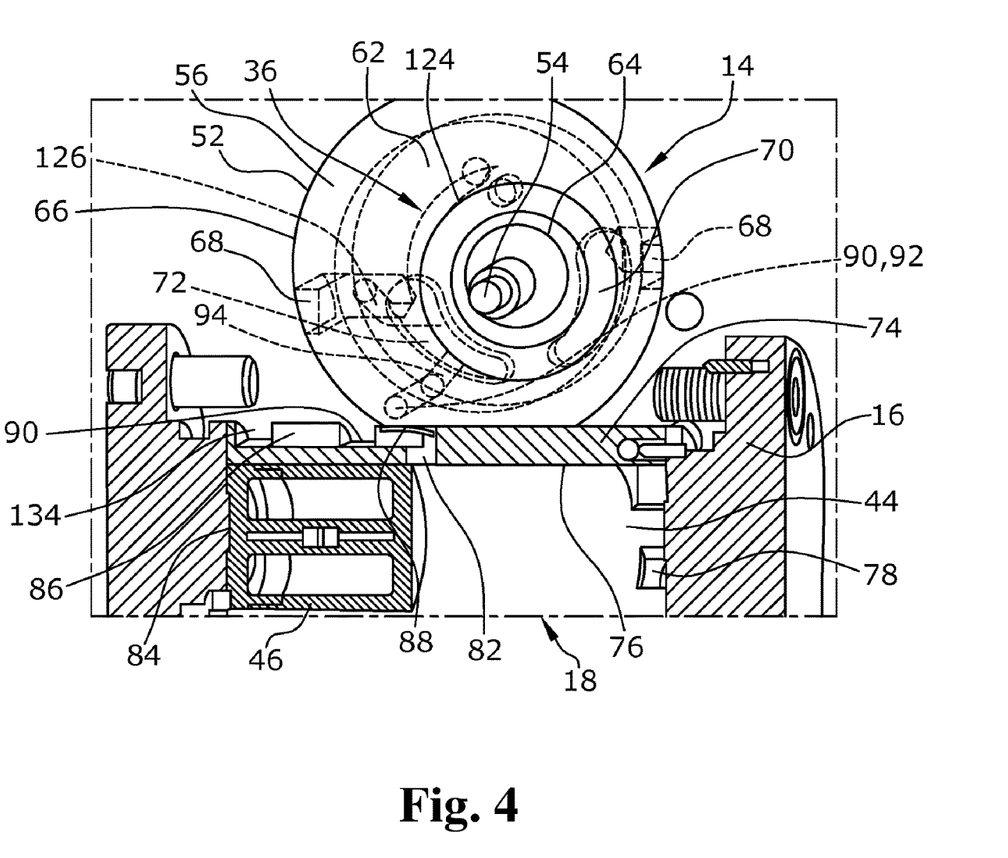
FIG. 4 shows a partial section through the measuring chamber of the differential pressure sensor and a view on the positive displacement housing.
Figure 6:
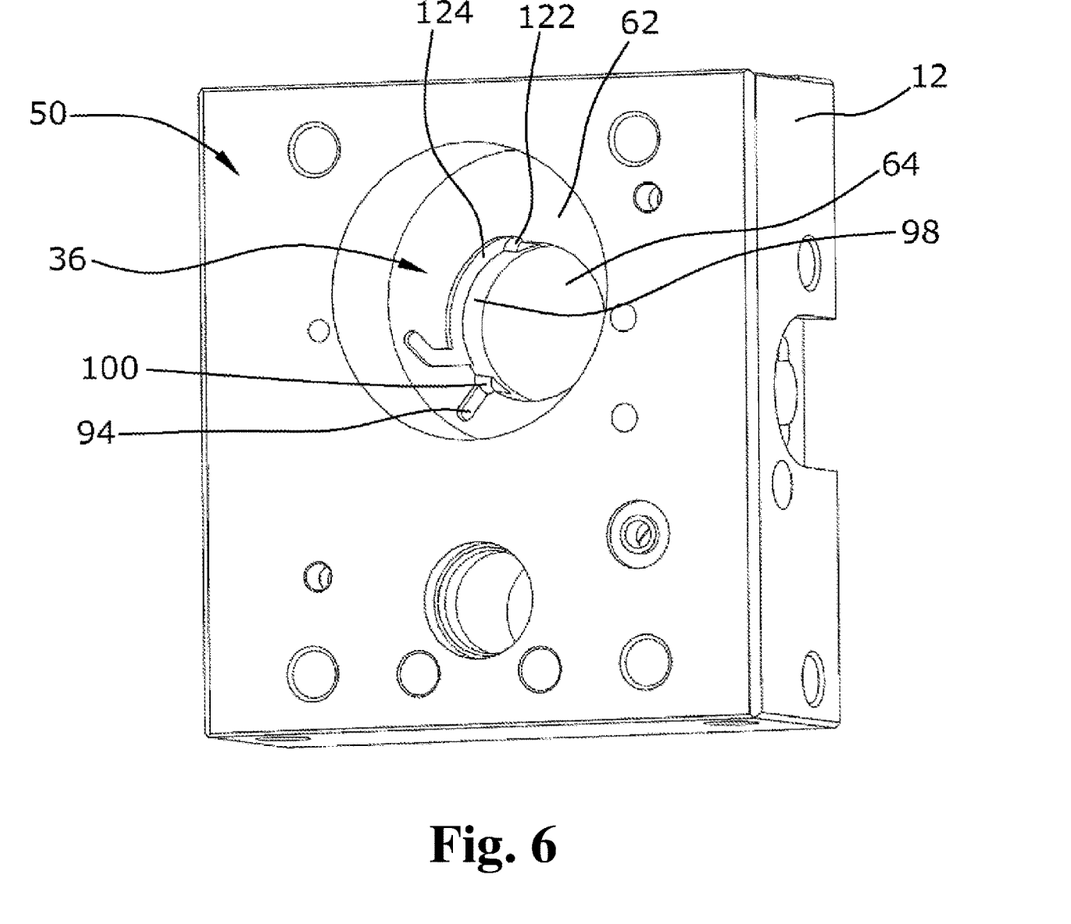
FIG. 6 shows a perspective view of the positive displacement housing with the sleeve and the gears not yet mounted.

FIGS. 4 and 6 illustrate the positive displacement housing 12 in a view on a stop surface 50 by which the positive displacement housing 12 abuts against the front-face delimiting wall 32 of the piston housing 16 delimiting the positive displacement chamber 36 on the front side. A receiving opening 52 is formed in the positive displacement housing 12, into which opening a drive shaft 54 of the drive unit of the positive displacement flow meter 14 protrudes. A sleeve 56 is set into this receiving opening 52, which radially delimits the positive displacement chamber 36 and correspondingly receives an inner gear which serves as a drivable impeller 58, as well as an internally-toothed outer gear 60 of the positive displacement flow meter 14. The sleeve 56, which is essentially pot-shaped, correspondingly comprises an opening 64 in its rear wall 62 delimiting the positive displacement chamber 36 on the rear side, the drive shaft 54 protruding into the positive displacement chamber 36 through the bore.

In a radially delimiting outer wall 66 of the sleeve 56, two grooves 68 are formed in the outer circumference, and two bores connected with these two grooves 68 are formed in the rear wall 62, via which two bores the supply duct 30 or the discharge duct 40, respectively, is connected with a second kidney-shaped supply port 70 or a second kidney-shaped discharge port 72 of the positive displacement flow meter 14 so that the positive displacement flow meter 14 is supplied with the measuring fluid from both front end faces.

In operation of the device for measuring flow processes, the fuel serving as the measuring fluid reaches the inlet 20 via a high pressure pump and one or a plurality of injection valves and flows on to the two kidney-shaped supply ports 34, 70 via the supply duct 30 into the positive displacement chamber 36, whereby the positive displacement chamber 36 is filled both from the front and the rear side. After having been conveyed by the rotation of the drivable impeller 58, the fuel leaves the positive displacement chamber 36 via the two kidney shaped discharge ports 38, 72 and flows back to the outlet 22 via the discharge duct 40.

Due to the fuel being conveyed by the positive displacement flow meter 14, as well as to the injection of the fuel into the inlet 20 and to the fluidic connection of the inlet with the front side of the piston 46, as well as the connection of the outlet 22 with the rear side of the piston 46 via the bypass 42, a pressure difference can be created between the front and the rear side of the piston 46 which causes an excursion of the piston 46 from its rest position. The excursion of the piston 46 is accordingly a measure of the prevailing pressure difference. A path sensor is therefore arranged at the measuring chamber 44, which path sensor is operatively connected with the piston 46 and in which the excursion of the piston 46 generates a voltage which is a function of the magnitude of the excursion. This path sensor mounted at the measuring chamber 44 is in particular a magneto-resistive sensor, by which the field strength of a magnet acting thereon is transformed into a voltage. It is also possible to use light sensors as path sensors.

The path sensor is connected with the evaluation and control unit 26 which receives the values from this path sensor and transmits corresponding control signals to the drive unit 24 which can, for example, be controlled so that the piston 46 always is in a defined initial position. The positive displacement flow meter 14 is thus driven so that the pressure difference which is caused at the piston 46 by the injected fluid is approximately balanced out in a continuous manner by conveying. A pressure sensor and a temperature sensor are further arranged in the measuring chamber 44, which continuously measure the pressures and temperatures prevailing in this region and also transmit these to the evaluation and control unit 26 so that changes in density can be taken into account in the calculation.

The procedure of the measuring is such that, when a total flow rate to be determined is calculated in the evaluation and control unit 26, both a flow rate in the bypass 42 which is generated by the movement or the position of the piston 46 and the volume displaced thereby in the measuring chamber 44, and an actual flow rate of the positive displacement flow meter 14 during a defined time interval are taken into account, and both flow rates are summed to determine the total flow rate.

The determination of the flow rate at the piston 46 is performed, for example, so that, in the evaluation and control unit 26 connected to the path sensor, the excursion of the piston 46 is differentiated and subsequently multiplied by the base surface of the piston 46 so that a volume flow in the bypass 42 in this time interval is obtained.

The flow rate through the positive displacement flow meter 14 can be determined either from the control data obtained or by the rotational speed, if the same is measured directly at the positive displacement flow meter 14 or at the drive unit 24, for example, by means of optical encoders or magneto-resistive sensors.

According to the present invention, the supply duct 30 and the discharge duct 40 are inclined, as can in particular be seen in FIGS. 2 and 3, so that, in the flow direction of the measuring fluid, a slope exists for two mounting positions. The first possible mounting position or operating position respectively corresponds to the position illustrated in the drawings, whereas the inlet and the outlet are directed upward in the second operating position. This inclined design has the effect that air bubbles in the fuel are always conveyed from the inlet to the positive displacement chamber 36 and from the positive displacement chamber 36 towards the outlet 22 and cannot settle and accumulate in dead spaces, since air rises in the fuel due to its lower density, even without active conveying. This is advantageous in particular upon the start-up of the device where the device must be flushed in order to reliably remove the air from all aggregates and lines of the device, which air would otherwise compromise the measuring values.

Figure 5:
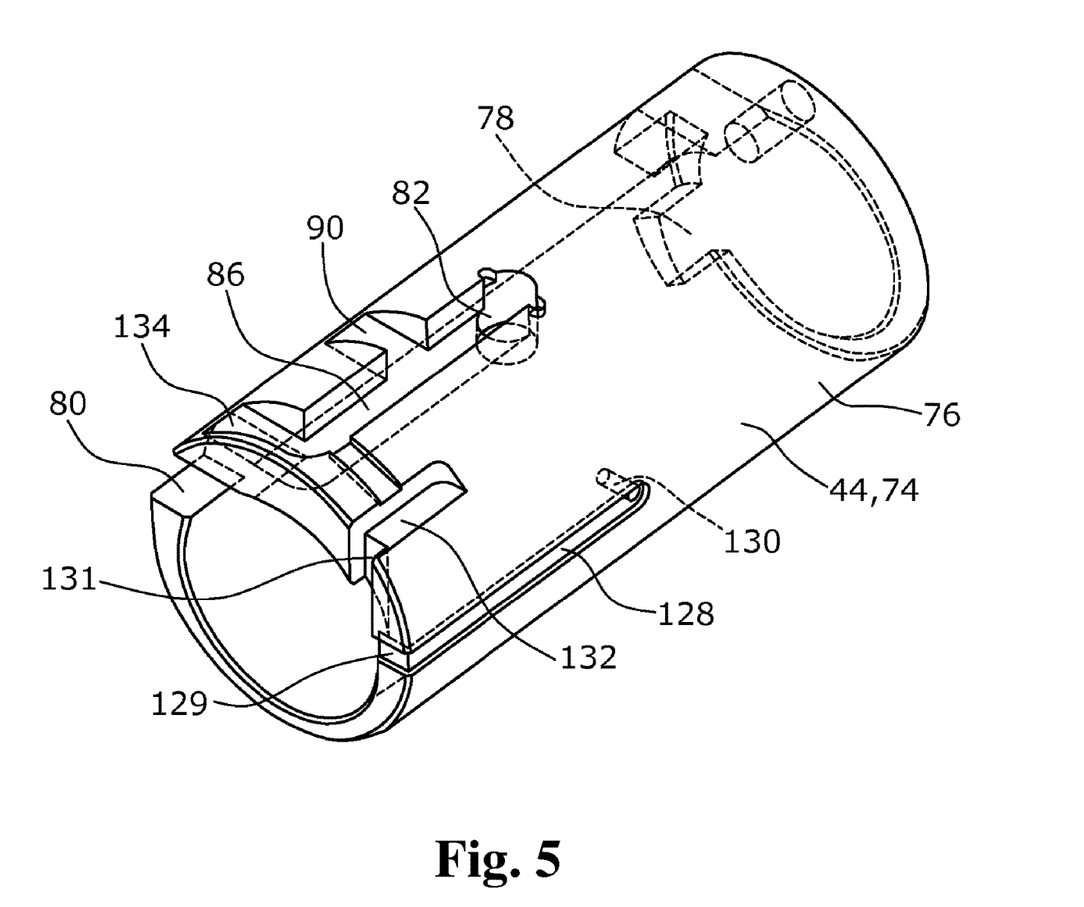
FIG. 5 shows a perspective view of the outer side of the measuring chamber.
Figure 7:
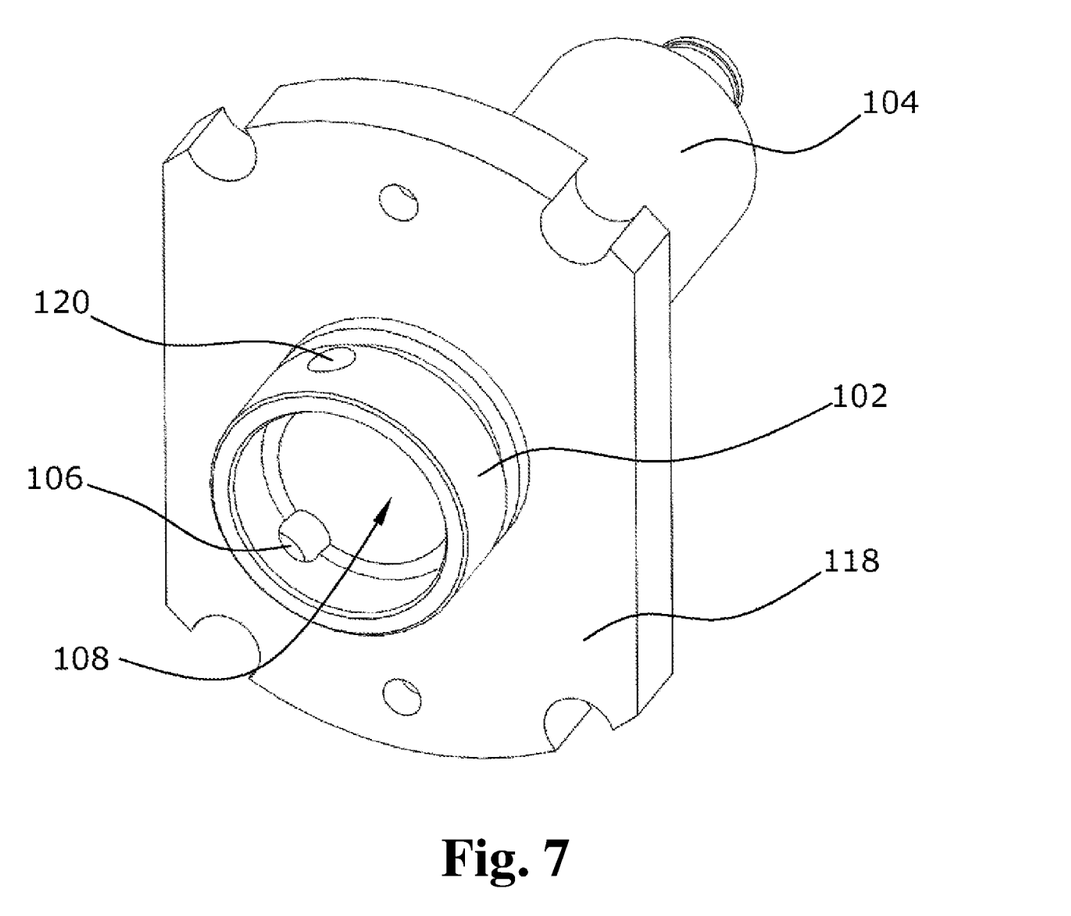
FIG. 7 shows a can of a drive unit adapted to be connected to the positive displacement housing.
Figure 8:
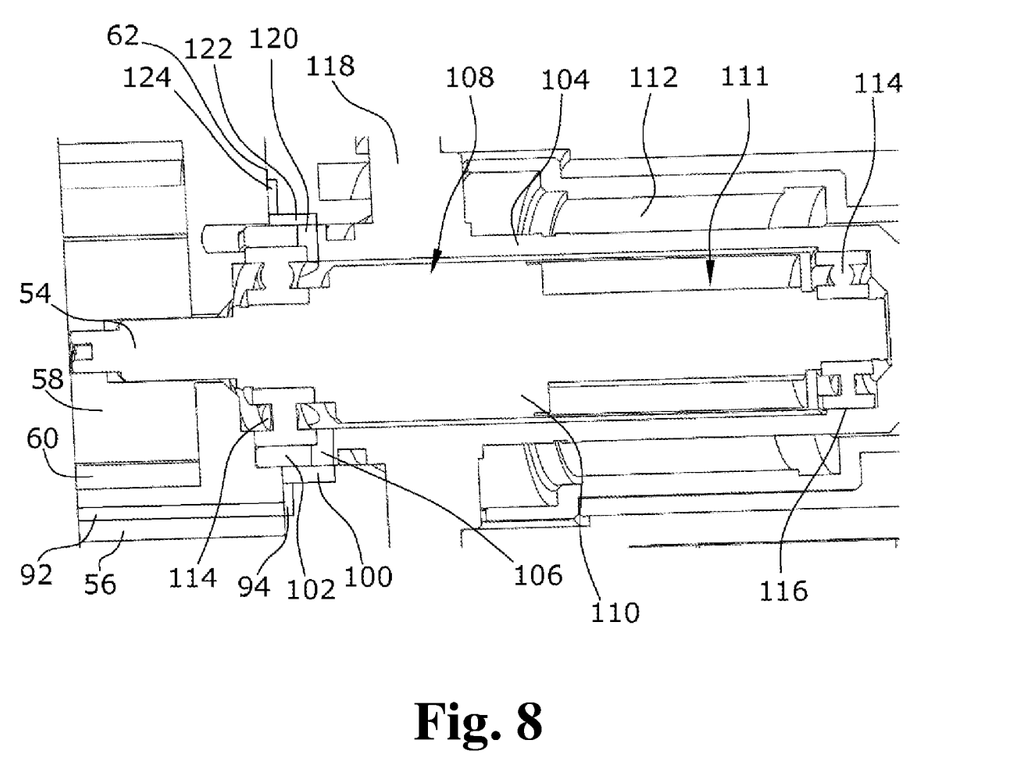
FIG. 8 shows a section through the drive unit mounted on the positive displacement housing.

A particular design of the measuring chamber 44 is additionally selected for this purpose, as can be seen in particular in FIG. 5. The hollow cylinder 74 forming the measuring chamber 44 has bores and millings at or in its radially delimiting shell surface 76 which serve as ducts, wherein the millings are closed by the surrounding piston housing 16 to form the ducts. Openings are formed at the opposite axial ends of the hollow cylinder 74, one of which serves as the supply port 78 and the axially opposite one serves as the discharge port 80, wherein the supply port 78 is connected with the inlet 41 of the bypass 42 and the discharge port 80 is connected with the discharge 45 of the bypass 42. On the upper side, the radially delimiting shell surface 76 of the measuring chamber 44 is formed with a first bypass port 82 which is at an axial distance from the stop 84 at the discharge-side end of the hollow cylinder 74, which stop 84 delimits the movement of the piston 46 in the axial direction, wherein the distance approximately corresponds to the axial length of the piston 46, so that this bypass port 82 is cleared when the piston 46 rests on the stop 84, as is shown in FIG. 4. The bypass port 82 leads into an axially extending bypass duct 86 and can be closed by a check valve 88 arranged at the bypass port 82, which check valve 88 provides that the measuring fluid can flow into the bypass duct 86 exclusively from the measuring chamber 44, but not in the opposite direction. A flushing line 90 branches from the bypass duct 86, which flushing line 90 first extends from the measuring chamber 44 through the piston housing 16, as can be seen in FIG. 2. The flushing line 90 continuous in the positive displacement housing 12 in the form of an axial passage bore 92 in the sleeve 56, as is shown in FIG. 4. The axial passage bore 92 opens into a groove 94 in the rear wall 62 of the positive displacement housing 12. In this rear wall 62, the opening 64 is formed at which the drive unit 24 positioned. It can be seen in FIG. 6 that a recess 100 is formed in the radially delimiting wall 98 radially delimiting the opening 64, which recess 100 extends the groove 94 in the axial direction. A collar 102 of a can 104 of the drive unit 24, shown in FIG. 7, abuts on the radially inner side against the radially delimiting wall 98, which collar 102 is formed in its lower portion with an inflow port 106 in the form of a bore that leads into a rotor chamber 108 formed inside the can 104, wherein inflow port 106 is formed immediately adjacent the recess 100 so that the flushing line 90 leads into the lower region of the rotor chamber 108.

A rotor 110 of an electric motor designed as a canned motor 111 is arranged in the rotor chamber 108, the rotor 110 carrying permanent magnets and being fastened on the drive shaft 54 and corresponding, in a manner known per se, to a stator 112 arranged radially outside the can 104 and surrounding the rotor 110, the rotor 110 being driven corresponding to the energization of the stator 112. The can 104 tightly closes the rotor chamber 108 off to the outside in the direction of the stator 112. Two bearings 114 for supporting the drive shaft 54 are correspondingly arranged inside the collar 102 of the can 104 or on the axially opposite side in a bearing seat 116 of the can 104, respectively. The can 104, and with it the electric motor designed as a canned motor 111, is fastened on the positive displacement housing 12 via a flange plate 118 extending radially immediately adjacent the collar 102 protruding into the opening 64.

An outflow port 120 leading radially outward from the rotor chamber 108 is formed at the upper side of the collar 102 of the can 104, which outflow port 120 opens into a further recess 122 in the radially delimiting wall 98 of the positive displacement housing 12 radially delimiting the opening 64. A groove 124 partly extending around the opening 64 extends this recess 122 up to an axial bore 126 in the sleeve 56 that opens into the groove 68 of the sleeve 56 which is fluidically connected to the discharge duct 40. Correspondingly, there is a fluidic connection of the flushing line 90 with the outlet 22 of the device via the rotor chamber 108. There is no direct connection of this bypass duct 86 with the discharge port 80. A forced flow through the rotor chamber 108 is accordingly created in case the bypass port 82 is open.

Upon start-up, the measuring fluid is correspondingly conveyed into the supply duct 30 via the inlet, while the positive displacement flow meter 14 is not operated. This creates a pressure difference over the piston 46, so that the piston 46 is displaced so far that the bypass port 82 is cleared and a flushing flow reaches the outlet 22 via the flushing line 90 and the rotor chamber 108. Since the components in which air bubbles could accumulate have the respective supply port 78/inflow port 106 in the lower region and the corresponding discharge port 80/outflow port 120 in the upper region, it is provided that the air present in the system is completely removed from the measuring chamber 44 and from the rotor chamber 108. When the positive displacement flow meter 14 has been activated thereafter, the air possibly still present in the positive displacement chamber 36 is, in addition, reliably discharged via the inclined discharge duct 40 so that the system is completely freed from air.

For the second operating position of the device, in which the inlet 20 and the outlet 22 are oriented upward, a second bypass duct 128 is connected, via a second bypass port 130, with the measuring chamber 44 at the radially delimiting shell surface 76 of the measuring chamber 44. This second bypass port 130 is also cleared when the piston 46 rests on the stop 84 at the discharge-side end. The second bypass duct 128 extends from the second bypass port 130 in the axial direction to the discharge-side axial end of the measuring chamber 44 and has a groove 129 at this end so that a fluidic connection to the discharge port 80 exists. This discharge-side end is also provided with a further groove 131 that leads to a bore formed in the piston housing 16 and serving as a bypass discharge duct 132, via which bore the discharge-side end of the measuring chamber 44 is directly connected with the discharge duct 40 of the device. Care should be taken when designing that the second bypass duct 128 is significantly smaller than the flushing line 90 so that it is provided in both mounting positions that a flushing of the rotor chamber 108 is performed. In the second mounting position, the air is correspondingly urged from the measuring chamber 44 towards the outlet primarily via the second bypass duct 128, namely both via the bypass discharge duct 132 and via the discharge 45 of the bypass 42.

In case the pressure in the flushing line 90 rises too far, which may in particular occur when the positive displacement flow meter becomes jammed, an emergency operation line 134 branches from the first bypass duct 86 downstream of the flushing line 90, as seen in the flow direction. A pressure limiting valve 136 is arranged in this emergency operation line 134, which pressure limiting valve 136 opens when a pressure of, for example, approximately 0.4 bar is exceeded. When this pressure is exceeded, the measuring fluid can be discharged to the outlet 22 via the emergency operation line 134 guided through the piston housing 16 to the discharge 45 of the bypass 42 so that damage to the device is prevented.

The described device of the present invention for measuring flow processes can thus be freed reliably and completely from air in two different mounting positions or operating positions, which, due to the compressibility of air, would compromise the measuring results as soon as an air bubble would come loose from the rotor chamber of the measuring chamber or the positive displacement chamber in operation. An accumulation of air in the ducts is also reliably avoided by their relative position. Improved measuring values are correspondingly obtained. Damage to the device is also avoided in case of pressure peaks occurring, such as may occur in particular upon a blocking or another failure of the positive displacement flow meter. These advantages are obtained without having to mount additional lines for flushing. The structure and the assembly of the device of the present invention accordingly remain economic.

It should be clear that the present invention is not limited to the described embodiment, but that various modifications are possible. The arrangement of the ducts and of the housing and the housing separations can be modified as well as the design of the positive displacement flow meter, which may also be designed, for example, as a double gear pump or as a vane pump. It is also possible to directly arrange the positive displacement flow meter in the recess, instead of the sleeve, or to design the sleeve without a rear wall of its own and to correspondingly form the ducts in the positive displacement housing itself. Instead of the described canned motor, it is also possible to use a magnetic clutch in the rotor chamber, wherein the inner rotor is arranged in the can and the outer rotor driven by an electric motor is arranged outside the stator. Further structural changes are also conceivable. Reference should also be had to the appended claims

What is claimed is:

1. A device for measuring flow processes of fluids, the device comprising:
   an inlet;
   an outlet;
   a drive unit;
   a positive displacement flow meter which is driven by the drive unit, the positive displacement flow meter comprising a positive displacement chamber;
   a supply duct which fluidically connects the positive displacement chamber to the inlet;
   a discharge duct which fluidically connects the positive displacement chamber to the outlet;
   a bypass which is configured to bypass the positive displacement flow meter;
   a differential pressure sensor arranged in the bypass; and
   an evaluation and control unit configured to provide a control of the positive displacement flow meter based on a differential pressure applied to the differential pressure sensor,
   wherein,
   the supply duct and the discharge duct are each configured to rise in a fluid flow direction.

2. The device as recited in claim 1, further comprising:
   a first bypass duct arranged at the differential pressure sensor; and
   a flushing line,
   wherein,
   the differential pressure sensor comprises a measuring chamber,
   the drive unit comprises a rotor chamber,
   the flushing line is arranged to open into the rotor chamber of the drive unit, and
   the first bypass duct is configured to extend from an interior of the measuring chamber into the flushing line.

3. The device as recited in claim 2, further comprising:
   an inflow port formed in a geodetically lower region of the rotor chamber into which inflow port the flushing line is configured to open into; and
   an outflow port formed in a geodetically upper region of the rotor chamber, the outflow port being fluidically connected with the outlet.

4. The device as recited in claim 2, further comprising:
a first bypass port is arranged from the measuring chamber to the first bypass duct;
a supply port into the measuring chamber;
a piston arranged inside the measuring chamber so as to be axially displaceable, the piston being configured to close or clear the first bypass port; and
a discharge-side stop configured to delimit a movement of the piston in an axial direction,
wherein,
the first bypass port is cleared by the piston so as to establish a fluidic connection between the supply port into the measuring chamber and the first bypass duct when the piston rests, on an outflow side, on the discharge-side stop which delimits the movement of the piston in the axial direction.

5. The device as recited in claim 4, wherein the first bypass port is formed at a geodetically highest point of the measuring chamber in a first operating position of the device.

6. The device as recited in claim 4, further comprising:
a hollow cylinder comprising a radially delimiting shell surface; and
a check valve arranged in the first bypass duct; and
a discharge port,
wherein,
the measuring chamber is delimited by the hollow cylinder,
the discharge port and the supply port are arranged at opposite ends of the radially delimiting shell surface,
the discharge port and the supply port open into the bypass at the opposite axial ends of the differential pressure sensor, and
the first bypass port is formed at the radially delimiting shell surface.

7. The device as recited in claim 6, wherein the flushing line branches from the first bypass duct downstream of the check valve.

8. The device as recited in claim 6, wherein the first bypass duct is fluidically connected with the discharge port of the measuring chamber exclusively via the rotor chamber.

9. The device as recited in claim 4, further comprising:
a piston housing; and
a positive displacement housing,
wherein,
the differential pressure sensor is arranged in the piston housing,
the positive displacement flow meter is arranged in the positive displacement housing, and
the flushing line is arranged to extend from the first bypass duct through the piston housing and through the positive displacement housing to the inflow port of the rotor chamber.

10. The device as recited in claim 9, further comprising:
a sleeve arranged in a receiving opening of the positive displacement housing, the sleeve comprising a bore,
wherein,
the positive displacement chamber is formed in the sleeve, and
a section of the flushing line that extends through the positive displacement housing is formed by the bore in the sleeve.

11. The device as recited in claim 9, wherein the flushing line is arranged to extend from the outflow port of the rotor chamber through the positive displacement housing and the piston housing to the outlet.

12. The device as recited in claim 2, further comprising:
a can,
wherein,
the rotor chamber is radially delimited by the can.

13. The device as recited in claim 12, further comprising:
a canned motor comprising an inner rotor and an outer stator,
wherein,
the can is configured to separate the inner rotor from the outer stator.

14. The device as recited in claim 12, further comprising:
a magnetic clutch comprising an inner rotor and an outer magnetic rotor,
wherein,
the can is configured to separate the inner rotor from the outer magnetic rotor.

15. The device as recited in claim 9, further comprising:
a second bypass duct arranged to open into the measuring chamber on a discharge side; and
a second bypass port formed at the measuring chamber, the second bypass port being oriented towards the inlet and the outlet and being arranged to open into the second bypass duct.

16. The device as recited in claim 15, further comprising:
a bypass discharge duct formed at the measuring chamber on the discharge side, the bypass discharge duct being arranged to extend from the measuring chamber through the piston housing into the discharge duct.

17. The device as recited in claim 15, wherein the second bypass port is smaller than the first bypass port.

18. The device as recited in claim 2, further comprising:
an emergency operation line arranged to branch off from the first bypass duct and to open into the discharge duct either directly or via a discharge of the bypass.

19. The device as recited in claim 18, further comprising:
a pressure limiting valve arranged in the emergency operation line.

20. The device as recited in claim 18, wherein the emergency operation line is arranged to branch off from the first bypass duct downstream of the flushing line.

* * * * *